United States Patent
Lawrence, III

(10) Patent No.: US 8,677,393 B2
(45) Date of Patent: Mar. 18, 2014

(54) METHODS AND APPARATUS TO VERIFY CONSUMPTION OF PROGRAMMING CONTENT

(75) Inventor: Bradley R. Lawrence, III, Tampa, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 500 days.

(21) Appl. No.: 12/580,835

(22) Filed: Oct. 16, 2009

(65) Prior Publication Data

US 2010/0037250 A1  Feb. 11, 2010

Related U.S. Application Data

(63) Continuation of application No. 11/608,495, filed on Dec. 8, 2006, now abandoned, which is a continuation of application No. PCT/US2004/017879, filed on Jun. 8, 2004.

(51) Int. Cl.
*H04N 7/10* (2006.01)

(52) U.S. Cl.
USPC ............. 725/32; 725/22; 725/34; 725/36

(58) Field of Classification Search
None
See application file for complete search history.

(56) References Cited

U.S. PATENT DOCUMENTS

| | | | |
|---|---|---|---|
| 4,885,632 A | 12/1989 | Mabey et al. | |
| 5,488,408 A | 1/1996 | Maduzia et al. | |
| 5,815,671 A | 9/1998 | Morrison | |
| 6,126,069 A | 10/2000 | Stiefel et al. | |
| 6,202,210 B1 | 3/2001 | Ludtke | |
| 6,457,010 B1 | 9/2002 | Eldering et al. | |
| 6,523,175 B1 | 2/2003 | Chan | |
| 6,708,335 B1 | 3/2004 | Ozer et al. | |
| 7,164,798 B2 * | 1/2007 | Hua et al. | 382/229 |
| 7,433,582 B2 | 10/2008 | Boston et al. | |
| 2001/0054181 A1 | 12/2001 | Corvin | |
| 2002/0120930 A1 | 8/2002 | Yona | |
| 2003/0122966 A1 * | 7/2003 | Markman et al. | 348/563 |
| 2006/0070095 A1 | 3/2006 | Newton et al. | |
| 2006/0107282 A1 * | 5/2006 | de Heer | 725/22 |
| 2008/0022296 A1 * | 1/2008 | Iggulden | 725/22 |
| 2008/0022305 A1 | 1/2008 | Thompson | |
| 2008/0209465 A1 | 8/2008 | Thomas et al. | |

FOREIGN PATENT DOCUMENTS

| | | |
|---|---|---|
| JP | 11-298812 A | 10/1999 |
| WO | 02/19581 A1 | 3/2002 |

OTHER PUBLICATIONS

Office action issued by the Canadian Patent Office in connection with Canadian Application No. 2,571,088 on Jul. 19, 2010 (6 pages).
Patent Cooperation Treaty, International Search Report and Written Opinion of International Searching Authority for PCT/US2004/017879, Jan. 24, 2005, 9 pages.

(Continued)

*Primary Examiner* — Cai Chen
(74) *Attorney, Agent, or Firm* — Hanley, Flight & Zimmerman, LLC

(57) ABSTRACT

Methods and apparatus to verify consumption of content are described herein. In an example method, a content library is generated within a data structure. The content library includes at least one content identifier associated with programming content. The programming content is insertable into content stream. A content stream including content for broadcasting on a broadcast device is received. To verify consumption of the programming content, a broadcast content identifier associated with the content for broadcasting is compared to the at least one content identifier of the content library.

19 Claims, 6 Drawing Sheets

(56) References Cited

OTHER PUBLICATIONS

Patent Cooperation Treaty, International Preliminary Report on Patentability for PCT/US2004/017879, Oct. 4, 2006, 13 pages.

Official Action issued in U.S. Appl. No. 11/608,495, issued Feb. 23, 2009, 27 pages.
Official Action issued in U.S. Appl. No. 11/608,495, issued Aug. 3, 2009, 26 pages.

\* cited by examiner

METHODS AND APPARATUS TO VERIFY CONSUMPTION OF PROGRAMMING CONTENT

RELATED APPLICATION

This patent is a continuation of U.S. patent application Ser. No. 11/608,495, entitled, "Methods and Apparatus to Verify Consumption of Programming Content," filed on Dec. 8, 2006, which is a continuation of International Application Serial Number PCT/US2004/017879, entitled "Methods and Apparatus to Verify Consumption of Programming Content," filed on Jun. 8, 2004, which are hereby incorporated herein in their entireties.

TECHNICAL FIELD

The present disclosure relates generally to verification systems, and more particularly, to methods and apparatus to verify consumption of programming content.

BACKGROUND

With the advances in today's technology, audience measurement companies are presented with greater challenges to collect viewing data to determine viewing habits of viewers. For example, personal video recorders (PVR) present such a challenge to collect viewing data because PVRs allow viewers to play back and view programming at a later time (i.e., in a time-shifted manner). Typically, however, methods to collect viewing data depend on the programming being viewed at the time of broadcast (i.e., real-time). To illustrate this concept, signatures of a program taken at a household are either collected with broadcast timestamp information or associated with a time at which they were received at the household receiver (e.g., a set top box). The signatures are then compared to either reference signatures having the same broadcast time stamp or reference signatures that were broadcasted at or around the same time to identify a match. Comparing broadcast time reduces the amount of signature comparisons that are required to identify a match. However, PVRs allow viewers to skip programming content such as commercials at their discretion to avoid consumption of the programming content. Thus, audience measurement companies are researching different ways to verify programming content is shown to viewers.

DETAILED DESCRIPTION

Although the following discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

In addition, while the following disclosure is made with respect to example television systems, it should be understood that the disclosed system is readily applicable to many other media systems. Accordingly, while the following describes example systems and processes, persons of ordinary skill in the art will readily appreciate that the disclosed examples are not the only way to implement such systems.

Figure 1:
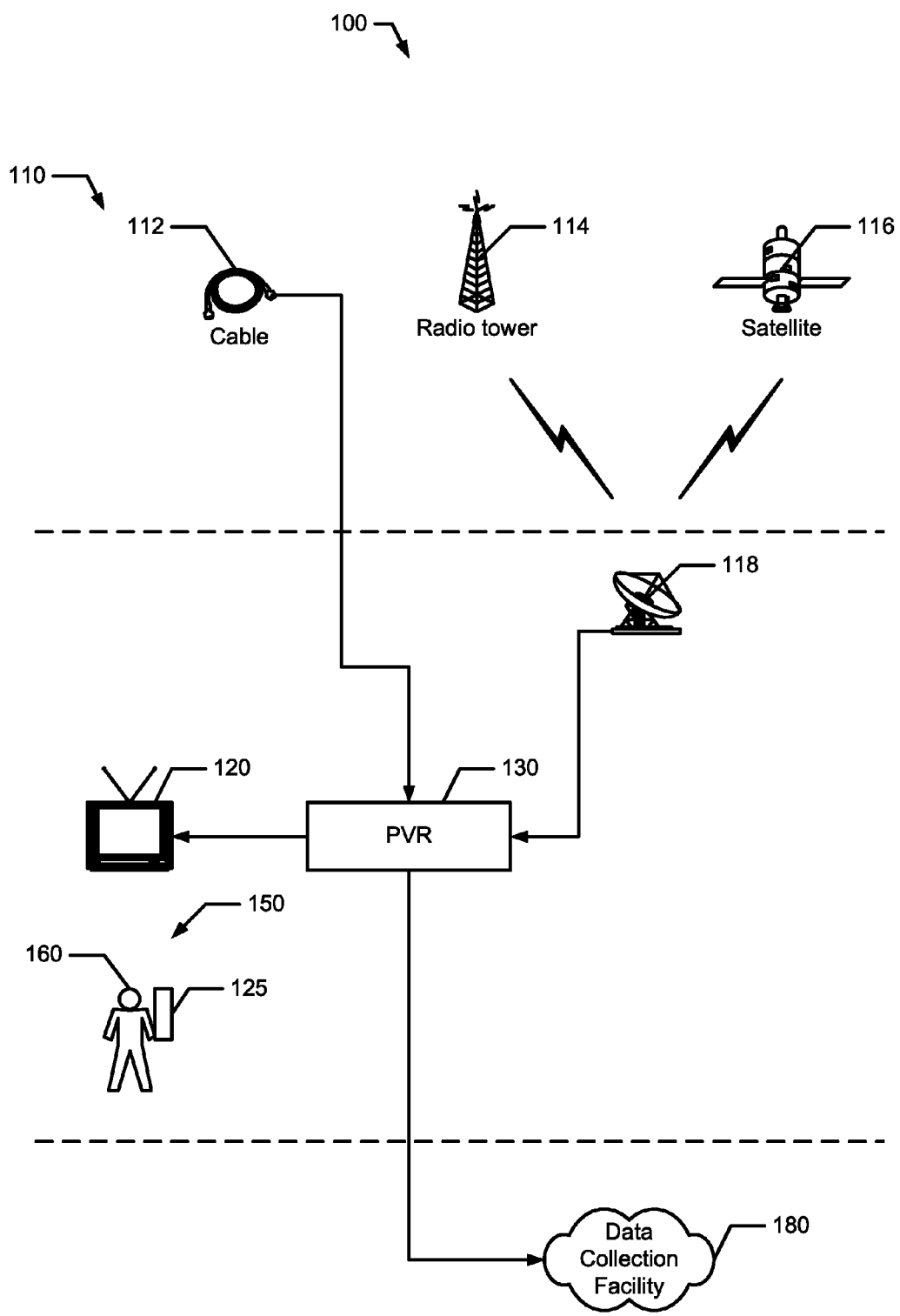
FIG. 1 is a block diagram representation of an example television system.

In the example of FIG. 1, an example television system 100 including a television service provider 110, a television 120, a remote control device 125, and a personal video recorder (PVR) 130, is metered using an audience measurement system. The components of the television system 100 may be coupled in any well known manner. The television 120 is positioned in a viewing area 150 located within a house occupied by one or more people, referred to as household members 160, all of whom have agreed to participate in an audience measurement research study. The viewing area 150 includes the area in which the television 120 is located and from which the television 120 may be viewed by one or more household members 160 located in the viewing area 150. Based on the viewing of the household members 160, the PVR 130 may be configured to send viewing data to a data collection facility 180. For example, the PVR 130 may transmit content information such as which programming content was displayed and when it was displayed on the television 120 for viewing by the household members 160. The data collection facility 180 may be configured to process and store data received from the PVR 130.

The television service provider 110 may be implemented using any television service provider such as, for example, a cable television service provider 112, a radio frequency (RF) television service provider 114, and/or a satellite television service provider 116. The television 120 receives a plurality of television signals transmitted via a plurality of channels by the television service provider 110 and may be adapted to process and display television signals provided in any format such as a National Television Standards Committee (NTSC) television signal format, a high definition television (HDTV) signal format, an Advanced Television Systems Committee (ATSC) television signal format, a phase alteration line (PAL) television signal format, a digital video broadcasting (DVB) television signal format, an Association of Radio Industries and Businesses (ARIB) television signal format, etc. The user-operated remote control device 125 allows a user to cause the television 120 to tune to and receive signals transmitted on a desired channel, and to cause the television 120 to process and present the programming content contained in the signals transmitted on the desired channel. The processing performed by the television 120 may include, for example, extracting a video and/or an audio component delivered via the received signal, causing the video component to be displayed on a screen/display associated with the television 120, and causing the audio component to be emitted by speakers associated with the television 120. The programming content contained in the television signal may include, for example, a television program, a movie, an advertisement, a video game, and/or a preview of other programming content that is currently offered or will be offered in the future by the television service provider 110.

While the components shown in FIG. 1 are depicted as separate functional blocks within the television system 100, the functions performed by some of these blocks may be integrated within a single unit or may be implemented using two or more separate components. For example, although the television 120 and the PVR 130 are depicted as separate functional blocks, persons of ordinary skill in the art will readily appreciate that the television 120 and the PVR 130 may be integrated into a single unit.

Figure 2:
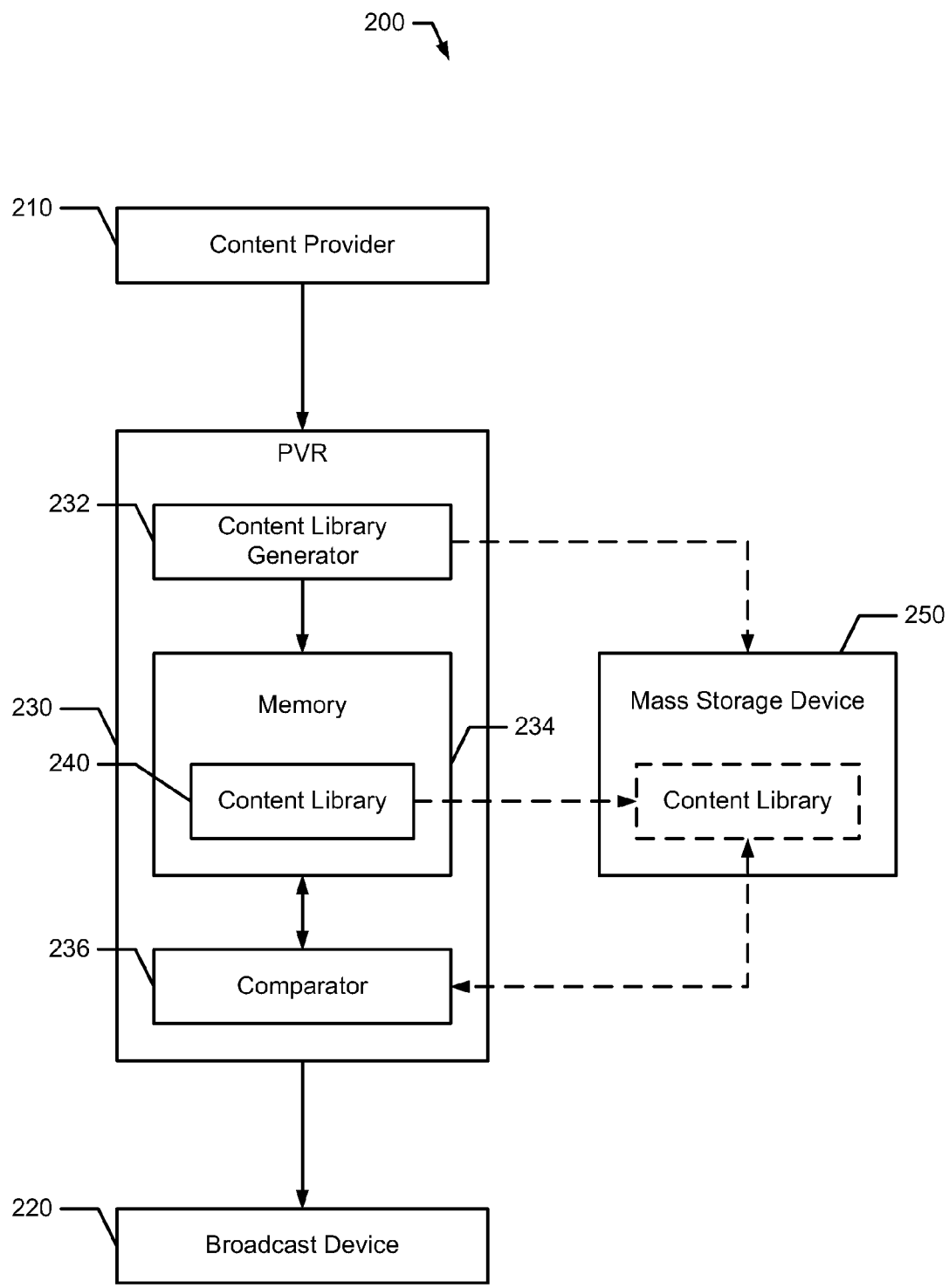
FIG. 2 is a block diagram representation of an example programming content verification system.

In the example of FIG. 2, a programming content verification system 200 includes a content provider 210, a broadcast device 220, and a PVR 230. In general, the content provider 210 (e.g., the television service provider 110) provides the PVR 230 with content streams to display on the broadcast device 220 (e.g., the television 120). The PVR 230 includes a content library generator 232, a memory 234, and a comparator 236. The content library generator 232 generates a content library 240 as described in detail below and stores the content library 240 in the memory 234. Alternatively, the content library generator 232 may store the content library 240 in a mass storage device 250. Examples of such mass storage device(s) 250 include floppy disks and drives, hard disk drives, compact disks and drives, and digital versatile disks (DVD) and drives. As noted above, the PVR 230 receives content streams from the content provider 210. In particular, the comparator 236 extracts a broadcast content identifier associated with programming content from a content stream currently being broadcasted to the PVR 230. To verify consumption of the insertable content, the comparator 236 compares the broadcast content identifier to the content identifiers previously stored in the content library 240 and/or the mass storage device 250.

To illustrate the concept of verifying consumption of programming content, a content stream sent to the PVR 230 from the content provider 210 may include programming content which is insertable into content streams. For example, the insertable content may be an advertisement, a program, an interactive television application, and/or an alternate portion of a program. The PVR 230 may receive the insertable content via an in-band transmission. That is, the insertable content may be merged with data of the content stream prior to transmission to the PVR 230. For example, a local advertisement may be inserted into the content stream of a nationally televised program prior to transmission of the content stream to the PVR 230. Thus, the PVR 130 receives the insertable content and the content stream from the content provider 210 over the same link (e.g., same cable).

Alternatively, the insertable content may be sent to the PVR 230 via an out-of-band transmission (i.e., the insertable content is transmitted separate from the content stream). In particular, the content stream and the insertable content may be transmitted physically over separate set of wires to the PVR 230. For example, the content stream (e.g., a nationally televised program) may be transmitted to the PVR 230 via a cable whereas the insertable content (e.g., a local advertisement) may be transmitted to the PVR 230 via a dial-up modem. In contrast to an in-band transmission of the insertable content (i.e., the insertable content is merged with data of the content stream prior to transmission to the PVR 230), the insertable content of an out-of-band transmission is merged with data of the content stream at the PVR 230.

To identify the insertable content received via either an in-band transmission or an out-of-band transmission, the PVR 230 generates a content library 240. For example, the content library 240 may be stored locally in the memory 234 of the PVR 230. As another example, the content library 240 may be stored on a remote storage device such as the mass storage device 250. If the insertable content is transmitted via an in-band transmission, the PVR 230 extracts the insertable content from the content stream and stores the insertable content in the content library 240. On the other hand, if the insertable content is transmitted via an out-of-band transmission, the PVR 230 directly stores the insertable content (i.e., without having to extract the insertable content from the content stream). To conserve size of the storage devices, the PVR 230 (e.g., via the processor 232) may store a portion of the insertable content into the memory 234 and/or the mass storage device 250 rather than storing the insertable content in its entirety. Alternatively, the PVR 230 may store a content identifier associated with the insertable content to identify the insertable content. For example, the content identifier may be an audio signature, a video signature, an audio code, a digital identifier (e.g., an audience measurement packet, or a cyclical redundancy code (CRC)) and/or a video code of the insertable content. The PVR 230 may be coupled to a serial data channel metering attachment as described in, for example, U.S. Pat. No. 5,488,408 entitled "Serial Data Channel Metering Attachment for Metering Channels to which a Receiver is Tuned" and issued on Jan. 30, 1996 to identify the content identifier of the insertable content. The subject matter of U.S. Pat. No. 5,488,408 is hereby incorporated by reference. In addition to identifying the insertable content using the examples of content identifier mentioned above, the PVR 230 may use blank frame detection technology as described in, for example, International PCT Patent Application No. PCT/US04/09910 entitled "Methods and Apparatus to Detect a Commercial in a Video Broadcast Signal" and filed on Mar. 29, 2004, to identify a blank image associated with the insertable content. The subject matter of International PCT Patent Application No. PCT/US04/09910 is hereby incorporated by reference. Based on the content identifiers stored in the content library 240, the PVR 230 may verify consumption of programming content when a content stream including the programming content is received by the PVR 230 as described in detail below.

Figure 3:
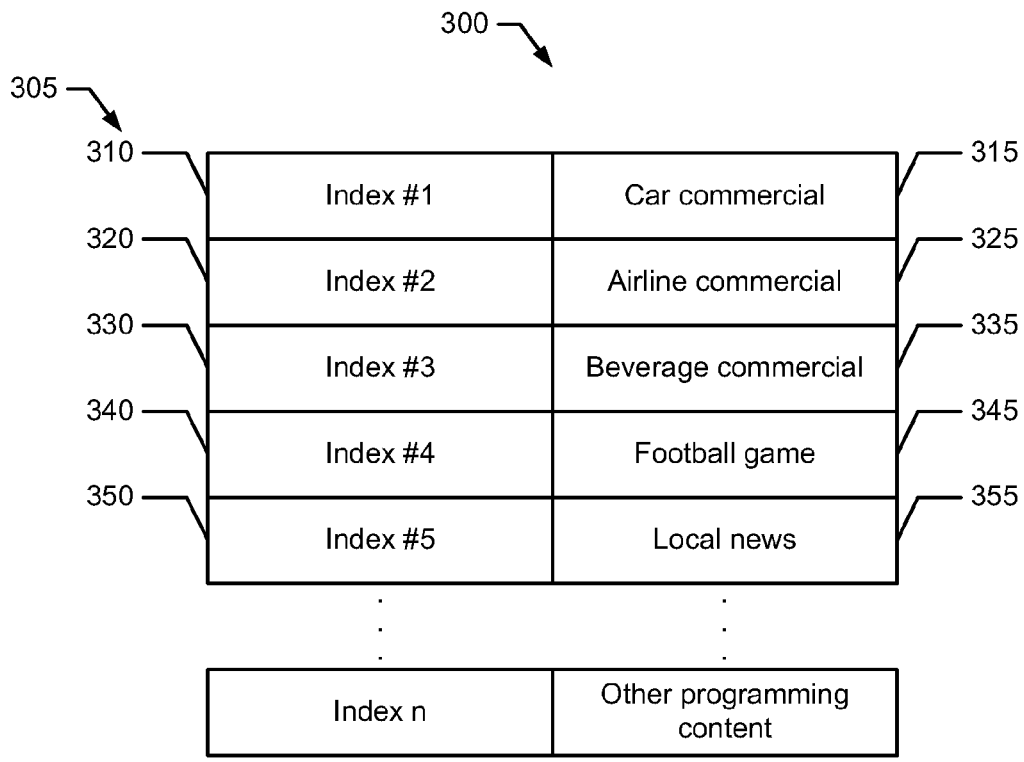
FIG. 3 is a block diagram representation of an example programming content index that may be used by the example programming content verification system of FIG. 2.

Further, the PVR 230 may receive a data structure (e.g., the index 300 of FIG. 3) from the content provider 210 to identify the insertable content as described in detail below. The data structure may be an index, a list, a table, a database and/or any other suitable data configuration that includes information such as an identifier corresponding to an insertable content. In the example of FIG. 3, the index 300 may include index numbers 305 such as index #1 310 corresponding to a car commercial 315, index #2 320 corresponding to an airline commercial 325, index #3 330 corresponding to a beverage commercial 335, index #4 340 corresponding to a football game 345, and index #5 350 corresponding to local news 355. Thus, the PVR 230 may identify a programming content with the index numbers 305 and transmit the index number corresponding to the programming content to the data collection facility 180 after verifying consumption of the programming content. The index numbers 305 may be used to indicate which insertable content was displayed to viewers.

Because the PVR 230 allow viewers to play back and view programming content in a time-shifted manner and/or skip programming content such as a television advertisement, the PVR 230 measures the actual display of the programming content at a later time by storing the content identifier associated with the programming content in the content library 240 upon receipt of the programming content. Thus, the PVR 230 may determine whether the programming content was actually displayed (i.e., rather than being skipped) regardless of whether the programming content was viewed either in real-time or in a time-shifted manner.

While the components shown in FIG. 2 are depicted as separate functional blocks within the programming content verification system 200, the functions performed by some of these blocks may be integrated within a single unit or may be implemented using two or more separate components. For example, although the PVR 230 and the broadcast device 220 are depicted as separate functional blocks, persons of ordinary skill in the art will readily appreciate that the PVR 230 and the broadcast device 220 may be integrated into a single unit.

Figure 4:
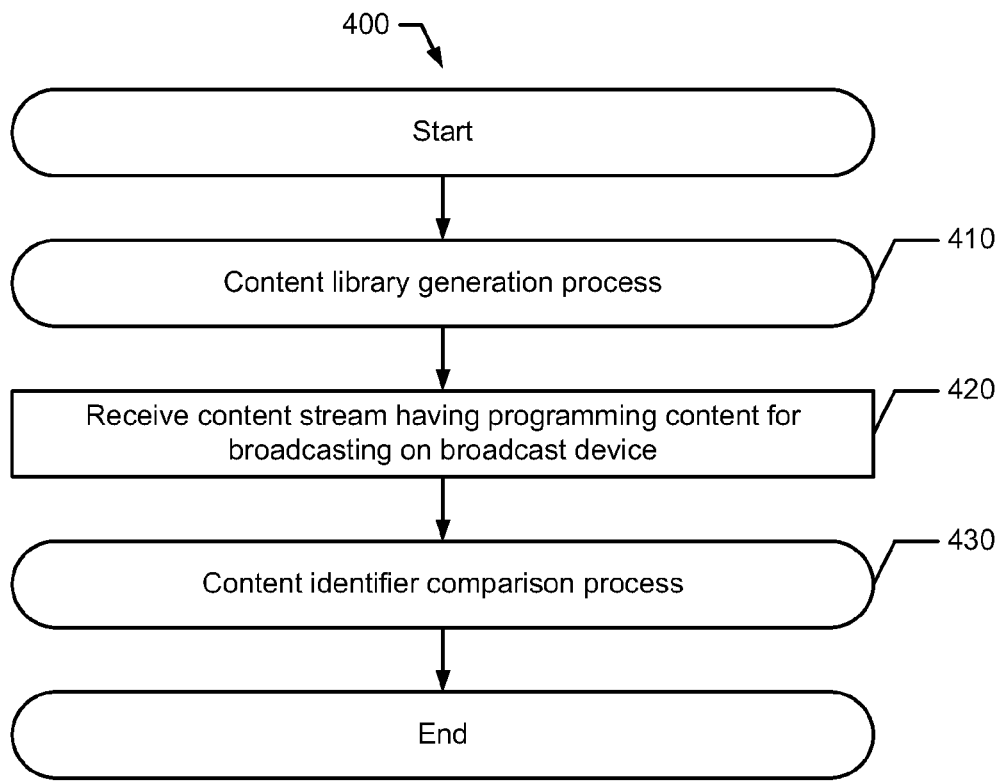
FIG. 4 is a flow diagram representation of example machine readable instructions that may be executed to implement the example programming content verification system of FIG. 2.
Figure 5:
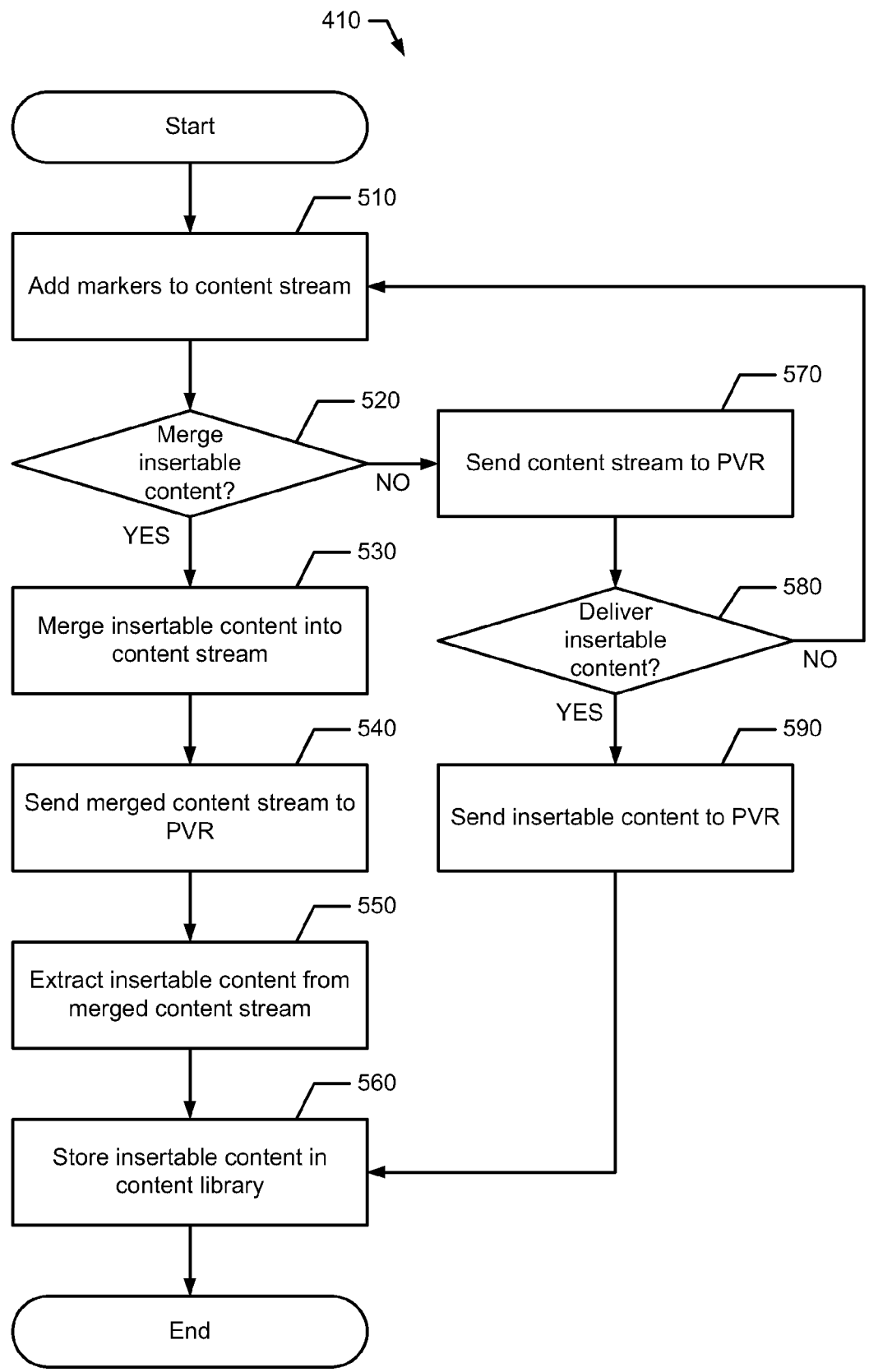
FIG. 5 is a flow diagram representation of example machine readable instructions that may be executed to implement a content library generation process of the example programming content verification system of FIG. 2.

A flow diagram 400 representing machine readable instructions that may be executed by a processor (e.g., the processor 1020 of FIG. 7) to verify consumption of programming content is illustrated in FIG. 4. Persons of ordinary skill in the art will appreciate that the instructions may be implemented in any of many different ways utilizing any of many different programming codes stored on any of many computer-readable mediums such as a volatile or nonvolatile memory or other mass storage device (e.g., a floppy disk, a CD, and a DVD). For example, the machine readable instructions may be embodied in a machine-readable medium such as an erasable programmable read only memory (EPROM), a read only memory (ROM), a random access memory (RAM), a magnetic media, an optical media, and/or any other suitable type of medium. Alternatively, the machine readable instructions may be embodied in a programmable gate array and/or an application specific integrated circuit (ASIC). Further, although a particular order of actions is illustrated in FIG. 4, persons of ordinary skill in the art will appreciate that these actions can be performed in other temporal sequences. Again, the flow diagram 400 is merely provided and described in conjunction with the example programming content verification system of FIGS. 2 and 3 as an example of one way to verify consumption of programming content.

In the example of FIG. 4, the flow diagram 400 begins with the content library generator 232 generating the content library 240 within the memory 234 (block 410). Alternatively, the content library generator 232 may generate the content library 240 within the mass storage device 250. The content library 240 includes at least one content identifier associated with an insertable content to serve as a reference. Referring to FIG. 4, for example, the content provider 210 adds markers and/or flags in a content stream indicating locations within the content stream where insertable contents may be inserted (i.e., the markers and/or flags serve as place holders within the content stream) (block 510). For example, a content stream of a nationally televised program may include markers and/or flags to indicate where within the content stream that a local advertisement may be inserted. In another example, a content stream of a movie may include markers and/or flags to indicate where an alternative and/or additional scene may be inserted within the content stream.

As noted above, the insertable content may be transmitted to the PVR 230 via either an in-band transmission or an out-of-band transmission. Accordingly, the content provider 210 determines whether to merge the insertable content into the content stream (block 520). For an in-band transmission of the insertable content, the content provider 210 merges the insertable content into the content stream prior to transmission (block 530) so that the insertable content is sent over the same channel as the data of the content stream to the PVR 230 (block 540). To generate the content library 240, the PVR 230 extracts a content identifier associated with the insertable content from the merged content stream (block 550) and stores the content identifier in the content library 240 (block 560). For example, the content identifier may be an audio signature, a video signature, an audio code, a video code, and/or a portion of the insertable content.

Referring back to block 520, if the content provider 210 decides to transmit the insertable content via an out-of-band transmission, then the content stream is transmitted separately from the insertable content to the PVR 230 (block 570). In particular, the insertable content is transmitted to the PVR 230 via a link separate from the link carrying data of the content stream. For example, the content stream of the nationally televised program may be transmitted over cable link whereas a local advertisement may be transmitted over a dial-up link. The content provider 210 determines whether to deliver the insertable content to the PVR 230 (block 580). If the content provider 210 decides not to deliver the insertable content to the PVR 230 then controls return to block 510. Otherwise, the content provider 210 transmits the insertable content to the PVR 230 separate from the content stream (block 590) so that the PVR 230 may determine whether to merge the insertable content with data of the content stream. Further, PVR 230 may store the content identifier associated with the insertable content in the content library (block 560). As a result, the content library may include a plurality of content identifiers to serve as references when the PVR 230 verifies consumption of the insertable content as described in further detail below.

Figure 6:
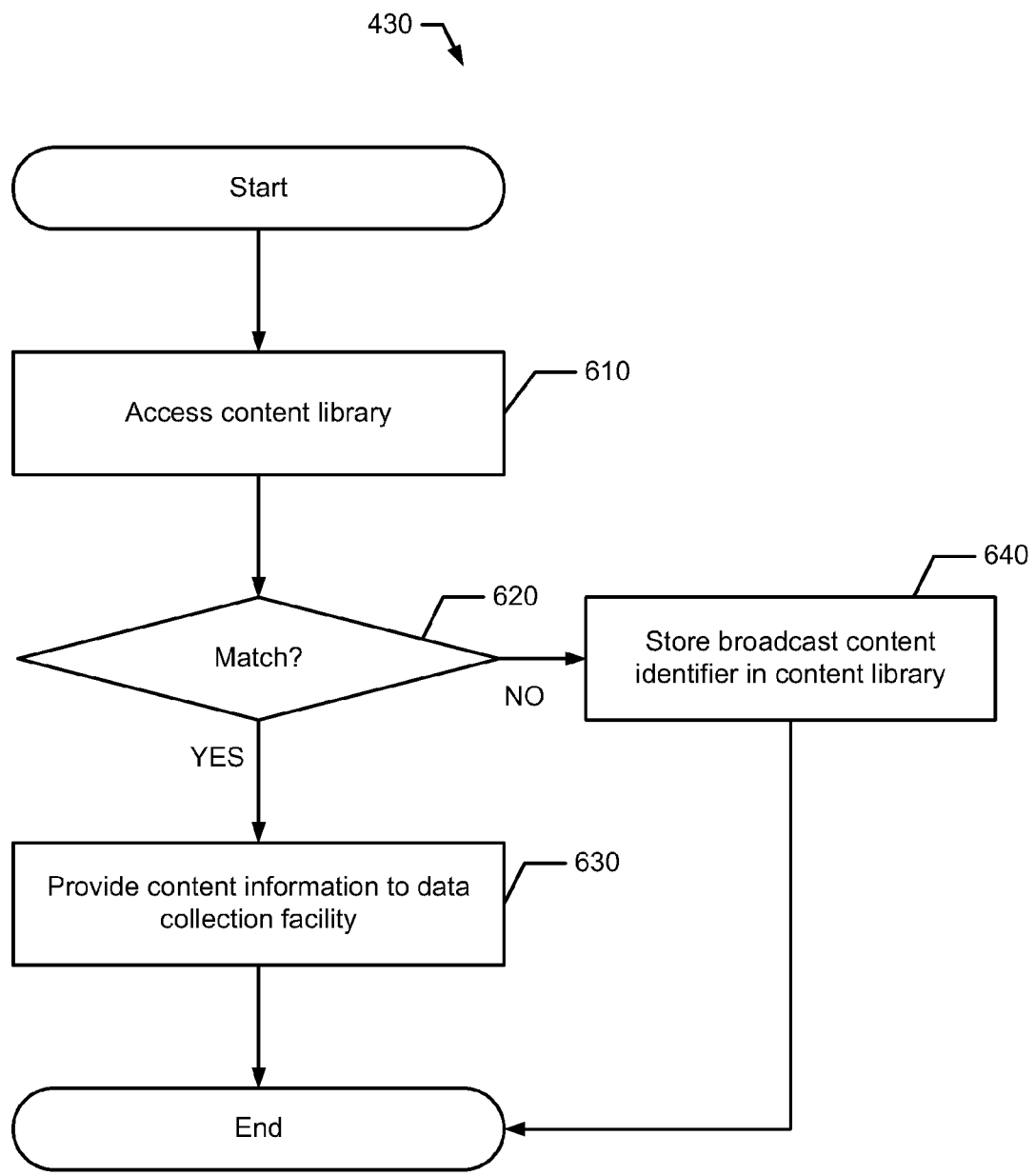
FIG. 6 is a flow diagram representation of example machine readable instructions that may be executed to implement a content identifier comparison process of the example programming content verification system of FIG. 2.

As noted above, the PVR 230 is configured to receive content streams from the content provider 210. Referring back to FIG. 4, the comparator 236 may extract a broadcast content identifier associated with programming content from a content stream currently being broadcasted to the PVR 230 (block 420). To verify consumption of the insertable content, the comparator 236 compares the broadcast content identifier to the content identifiers previously stored in the content library 240 (block 430). In the example of FIG. 6, the comparator 236 accesses the content identifiers previously stored in the content library 240 (block 610) and determines whether the broadcast content identifier matches one of the content identifiers previously stored in the content library 240 (block 620). For example, the comparator 236 may compare an audio signature, a video signature, an audio code, and/or a video code of an advertisement to the content identifiers stored in the content library 240. In another example, the comparator 236 may compare a portion of a program to the content identifiers stored in the content library 240.

As noted above, the PVR 230 includes the index 300 to identify the programming content upon detecting a match between the broadcast content identifier and at least one content identifier stored in the content library 240. For example, the PVR 230 may detect that the car commercial 315 was consumed by the viewer. Thus, the PVR 230 identifies the car commercial 315 is index #1 310 and verifies that the insertable content was consumed by the viewer. In response to detecting a match between the broadcast content identifier and at least one content identifier stored in the content library 240, the PVR 230 provides content information associated with the insertable content to the data collection facility 180 (block 630). In particular, the PVR 230 may provide information such as which insertable content and when it was displayed to a viewer. Following the example described above, the PVR 230 may transmit index #1 310 to the data collection facility 180 to indicate that the car commercial 315 was consumed. Otherwise if a match is not found, the PVR 230 updates and continues to build the content library 240 by storing the broadcast content identifier in the content library 240 (block 640) so that PVR 230 may verify consumption of programming content of content streams received in the future.

As noted above, the PVR 230 is configured to time-shift and/or to skip programming content (e.g., a television advertisement). By storing the content identifier associated with the programming content in the content library 240 upon receipt of the programming content, the PVR 230 may measure the actual display of the programming content at a later time even if the programming content is skipped. Thus, the PVR 230 may collect viewing data regardless of whether the programming content was viewed either in real-time or in a time-shifted manner.

While the methods and apparatus disclosed herein are particularly well suited for use to verify consumption of content with a PVR, the teachings of the disclosure may be implemented by other electronic devices such as a VCR without departing from the scope or spirit thereof.

Figure 7:
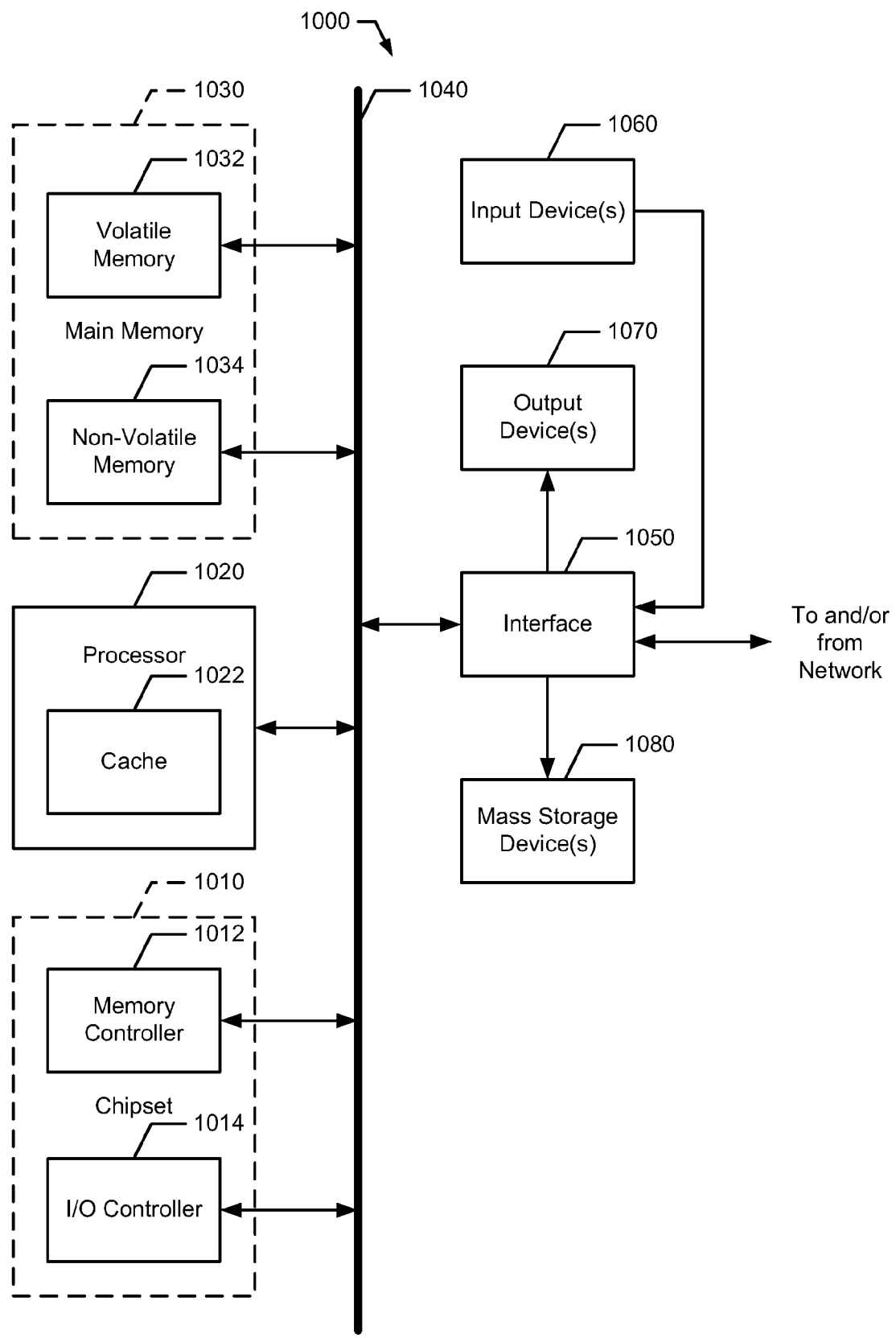
FIG. 7 is a block diagram representation of an example processor system that may be used to implement the example programming content verification system of FIG. 2.

FIG. 7 is a block diagram of an example processor system 1000 adapted to implement the methods and apparatus disclosed herein. The processor system 1000 may be a desktop computer, a laptop computer, a notebook computer, a personal digital assistant (PDA), a server, an Internet appliance or any other type of computing device.

The processor system 1000 illustrated in FIG. 7 includes a chipset 1010, which includes a memory controller 1012 and an input/output (I/O) controller 1014. As is well known, a chipset typically provides memory and I/O management functions, as well as a plurality of general purpose and/or special purpose registers, timers, etc. that are accessible or used by a processor 1020. The processor 1020 is implemented using one or more processors. The processor 1020 includes a cache 1022, which may be implemented using a first-level unified cache (L1), a second-level unified cache (L2), a third-level unified cache (L3), and/or any other suitable structures to store data as persons of ordinary skill in the art will readily recognize.

As is conventional, the memory controller 1012 performs functions that enable the processor 1020 to access and communicate with a main memory 1030 including a volatile memory 1032 and a non-volatile memory 1034 via a bus 1040. The volatile memory 1032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1034 may be implemented using flash memory, Read Only Memory (ROM), Electrically Erasable Programmable Read Only Memory (EEPROM), and/or any other desired type of memory device.

The processor system 1000 also includes an interface circuit 1050 that is coupled to the bus 1040. The interface circuit 1050 may be implemented using any type of well known interface standard such as an Ethernet interface, a universal serial bus (USB), a third generation input/output interface (3GIO) interface, and/or any other suitable type of interface.

One or more input devices 1060 are connected to the interface circuit 1050. The input device(s) 1060 permit a user to enter data and commands into the processor 1020. For example, the input device(s) 1060 may be implemented by a keyboard, a mouse, a touch-sensitive display, a track pad, a track ball, an isopoint, and/or a voice recognition system.

One or more output devices 1070 are also connected to the interface circuit 1050. For example, the output device(s) 1070 may be implemented by display devices (e.g., a light emitting display (LED), a liquid crystal display (LCD), a cathode ray tube (CRT) display, a printer and/or speakers). The interface circuit 1050, thus, typically includes, among other things, a graphics driver card.

The processor system 1000 also includes one or more mass storage devices 1080 to store software and data. Examples of such mass storage device(s) 1080 include floppy disks and drives, hard disk drives, compact disks and drives, and digital versatile disks (DVD) and drives.

The interface circuit 1050 also includes a communication device such as a modem or a network interface card to facilitate exchange of data with external computers via a network. The communication link between the processor system 1000 and the network may be any type of network connection such as an Ethernet connection, a digital subscriber line (DSL), a telephone line, a cellular telephone system, a coaxial cable, etc.

Access to the input device(s) 1060, the output device(s) 1070, the mass storage device(s) 1080 and/or the network is typically controlled by the I/O controller 1014 in a conventional manner. In particular, the I/O controller 1014 performs functions that enable the processor 1020 to communicate with the input device(s) 1060, the output device(s) 1070, the mass storage device(s) 1080 and/or the network via the bus 1040 and the interface circuit 1050.

While the components shown in FIG. 7 are depicted as separate blocks within the processor system 1000, the functions performed by some of these blocks may be integrated within a single semiconductor circuit or may be implemented using two or more separate integrated circuits. For example, although the memory controller 1012 and the I/O controller 1014 are depicted as separate blocks within the chipset 1010, persons of ordinary skill in the art will readily appreciate that the memory controller 1012 and the I/O controller 1014 may be integrated within a single semiconductor circuit.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method to verify presentation of media content, comprising:
   storing, at a media device located in a household, a plurality of instances of media content to be inserted into a content stream by the media device;
   storing, at the media device, a data structure including a plurality of index identifiers each assigned to one of the instances of media content to be inserted into the content stream, wherein a first content identifier corresponding to a first instance of the insertable media content is obtained at the media device prior to the media device outputting the first instance of insertable media content to a presentation device for time-shifted playback;
   detecting presentation of the content stream by the media device after the insertable media content is stored by the media device;
   extracting a second content identifier from the presentation of the content stream;
   comparing the second content identifier to the first content identifier; and
   when the second content identifier matches the first content identifier, identifying a first one of the index identifiers of the data structure assigned to the first instance of the insertable media content and conveying the first index identifier to a data collection facility as verification that the first instance of the insertable media content was presented by the media device.

2. A method as defined in claim 1, wherein the first and second content identifiers comprise at least one of an audio signature, a video signature, an audio code, a video code, a digital identifier, or a portion of the insertable media content.

3. A method as defined in claim 1, further comprising receiving a third content identifier at the media device via a first transmission medium, wherein the content stream is received at the media device via a second transmission medium different than the first transmission medium.

4. A method as defined in claim 3, wherein the first transmission medium is to carry an out-of-band transmission.

5. A method as defined in claim 1, wherein the first and second content identifiers are associated with one of a television advertisement, a television program, an interactive television application, or an alternate portion of the television program.

6. A method as defined in claim 1, further comprising conveying information related to the verifying of the first instance of the insertable media content as presented by the media device to the data collection facility, the information including an indication of a time or date that the first instance of the insertable media content was presented by the media device.

7. A tangible machine accessible storage device or disc comprising instructions that, when executed, cause a machine to at least:
    store, at a media device located in a household, a plurality of instances of media content to be inserted into a content stream by the media device;
    store, at the media device, a data structure including a plurality of index identifiers each assigned to one of the instances of the media content to be inserted into the content stream, wherein a first content identifier corresponding to a first instance of the insertable media content is obtained at the media device prior to the media device outputting the first instance of insertable media content to a presentation device for time-shifted playback;
    detect presentation of the content stream by the media device after the insertable media content is stored by the media device;
    extract a second content identifier from the presentation of the content stream;
    compare the second content identifier to the first content identifier; and
    when the second content identifier matches the first content identifier, identify a first one of the index identifier of the data structure assigned to the first instance of the insertable media content and conveying the first index identifier to a data collection facility as verification that the first instance of insertable media content was presented by the media device.

8. A tangible machine accessible storage device or disc as defined in claim 7, wherein the first and second content identifiers comprise at least one of an audio signature, a video signature, an audio code, a video code, a digital identifier, or a portion of the insertable media content.

9. A tangible machine accessible storage device or disc as defined in claim 7, the instructions to cause a machine to receive a third content identifier at the media device via a first transmission medium, wherein the content stream is received at the media device via a second transmission medium different than the first transmission medium.

10. A tangible machine accessible storage device or disc as defined in claim 9, wherein the first transmission medium is to carry an out-of-band transmission.

11. A tangible machine accessible storage device or disc as defined in claim 7, wherein the first and second content identifiers are associated with one of a television advertisement, a television program, an interactive television application, or an alternate portion of the television program.

12. A tangible machine accessible storage device or disc as defined in claim 7 having instructions stored thereon that, when executed, cause a machine to convey information related to the verifying of the media content as presented by the media device to the data collection facility, the information including an indication of a time or date that the media content was presented by the media device.

13. A video recorder located at a household, comprising:
    a library generator to generate a library including a plurality of content identifiers corresponding to media content received by the video recorder, the library generator to store the media content in a memory of the video recorder for playback in a time-shifted manner, the library generator to extract the content identifiers from the media content prior to the video recorder outputting the media content to a presentation device for the time-shifted playback of the stored media content;
    a memory to store a data structure including a plurality of index identifiers each assigned to one of the instance of media content to be inserted into the content stream;
    a comparator to compare a content identifier extracted from a time-shifted presentation on the presentation device to one or more of the plurality of content identifiers of the library; and
    a processor to, when the extracted content identifier matches one of the content identifiers of the library, identify a first one of the index identifiers assigned to the instance of the insertable media content corresponding to the matching content identifier of the library and to convey the first one of the index identifiers to a data collection facility as verification of the presentation of the stored media content.

14. A video recorder as defined in claim 13, wherein the plurality of content identifiers of the library comprises at least one of an audio signature, a video signature, an audio code, a video code, or a portion of programming content.

15. A video recorder as defined in claim 13, wherein the media content comprises at least one of a television advertisement, a television program, an interactive television application, or an alternate portion of the television program.

16. A video recorder as defined in claim 13, wherein the processor is to convey information related to the verifying of the media content as presented by the device to the data collection facility, the information including an indication of a time or date of the presentation of the media content.

17. A video recorder as defined in claim 13, wherein the media content is an insertable advertisement to be inserted into a content stream received at the household.

18. A method as defined in claim 3, further comprising storing the third content identifier in the library.

19. A tangible machine accessible device or disc as defined in claim 9, the instructions to cause a machine to store the third content identifier in the library.

* * * * *